Dec. 6, 1966 — O. R. SMITH — 3,289,474

BOREHOLE POROSITY TESTING DEVICE

Filed Aug. 19, 1963 — 2 Sheets-Sheet 1

ORVILLE R. SMITH
INVENTOR.

BY Robert G. Peter
ATTORNEY.

Dec. 6, 1966 — O. R. SMITH — 3,289,474
BOREHOLE POROSITY TESTING DEVICE
Filed Aug. 19, 1963 — 2 Sheets-Sheet 2

ORVILLE R. SMITH,
INVENTOR.

BY Robert G. Peter
ATTORNEY.

United States Patent Office 3,289,474
Patented Dec. 6, 1966

3,289,474
BOREHOLE POROSITY TESTING DEVICE
Orville R. Smith, Houston, Tex., assignor to Halliburton Company, Duncan, Okla., a corporation of Delaware
Filed Aug. 19, 1963, Ser. No. 302,848
8 Claims. (Cl. 73—155)

The present invention generally relates to the handling of fluids and, more particularly, to wireline apparatus and method for investigating, treating or producing a formation laterally of a borehole piercing the same.

Such apparatus and method are useful in that formations about a borehole at various depth zones may be selectively investigated as to their fluid content, porosity, and fluid flow permeability. The results of such an investigation are useful, in turn, in evaluating the probable productivity of such zones and, hence, are valuable aids in selecting from such zones those having the best productive potential for final completion. Such apparatus and method have further utility in carrying out formation treatments, such as acidizing and sand consolidation, in addition to being useful in the production of fluids contained within an earth formation.

In recent years, formation fluid sampling devices adapted for lowering within a borehole by means of a wireline have developed a degree of utility which renders these devices valuable as a practical means for obtaining samples of fluids contained within formations traversed by a borehole.

Although the fluid samples obtained by these devices, together with pressure data ordinarily concurrently obtained, are generally recognized as a valuable aid in the evaluation of the productive potential of a formation, it is further generally recognized that such evaluations would be greatly improved in reliability and accuracy provided other data which would further reveal the character of the formation under investigation could also be taken.

Accordingly, it is a principal object of this invention to provide a new and improved formation investigation apparatus and method which are capable of yielding more information concerning a formation to be evaluated.

Formation fluid sampler devices currently in general use, for the most part, rely on the differential pressure between formation pressure and atmospheric pressure within a chamber provided within the device to motivate the flow of sample fluid from the formation into a sample chamber. The flowing fluid sample is communicated from the formation to the sample chamber via a flow path which includes a sidewall sealing device for isolating the path, as well as the sample fluid flowing therein, from fluids normally contained in the borehole.

With this currently employed sampling arrangement, success in obtaining a fluid sample representative of formation fluid depends on the exclusion of borehole fluids therefrom. Borehole fluids are under hydrostatic pressure which, depending on depth and fluid density, may be of high intensity, ranging as high as 10,000 p.s.i. and above. The pressure in the sample line on the other hand is initially atmospheric. Thus, the sidewall sealing device is required to provide a seal with respect to the borehole wall which can withstand differential pressures which approach the hydrostatic pressure of the borehole in intensity.

This sealing requirement, although difficult to meet even with smooth borehole wall conditions, becomes extremely difficult to meet with rough borehole walls. Consequently, the combination of high differential pressure and rough borehole walls frequently result in leakage of borehole fluids past the sidewall sealing device with a consequent failure of the sample taking operation.

Accordingly, it is another principal object of this invention to provide new formation fluid apparatus of improved general effectiveness, efficiency, and reliability arising from a new construction and mode of operation which effectively reduces the differential pressures a sidewall sealing device must withstand.

Another object of the invention is the provision of new and improved apparatus for obtaining samples or producing the fluid content of an earth formation wherein such samplings or production is obtained at flow rates which are independent of the pressure within such earth formation.

Still another object of the invention is the provision of new and improved fluid sampling or producing apparatus wherein the fluid content of an earth formation is produced at a rate responsive to a predetermined pressure differential.

A still further object of the invention is the provision of new and improved apparatus adapted to obtain samples of the fluid content of an earth formation at flow rates controllable at the earth's surface.

Further, an object of the invention is the provision of new and improved sample taking apparatus incorporating a new and improved sample chamber and sample flow control system.

Still a further object of the invention is the provision of new and improved formation investigation apparatus capable of yielding information related to formation porosity and permeability, in addition to information ordinarily obtained concurrently with the sampling of the fluid content of an earth formation.

Another object of the invention is the provision of a new and improved method of investigating an earth formation with the view of evaluating its productive potential.

A further object of the invention is the provision of new and improved method and apparatus for producing the fluid content of an earth formation.

A still further object of the invention is the provision of new and improved apparatus adapted for carrying out formation treating operations such as acidizing or sand consolidation, for example.

Other and further objects of the invention will be obvious upon an understanding of the illustrative embodiments about to be described, or will be indicated in the claims, and various advantages not referred to herein will occur to one skilled in the art upon employment of the invention in practice. Preferred embodiments of the invention have been chosen for purposes of illustration and description. The preferred embodiments are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular uses contemplated.

Figure 6:
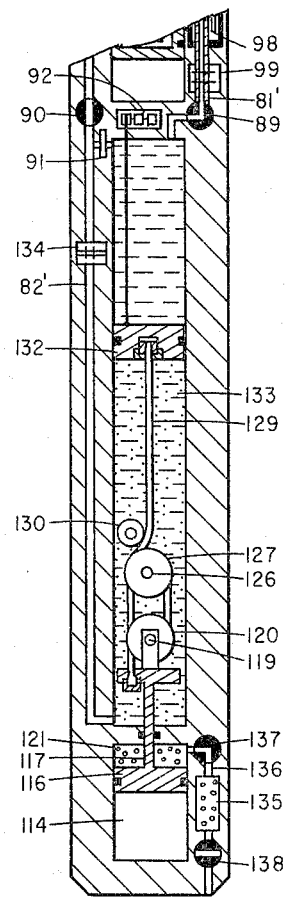
Figure 7:
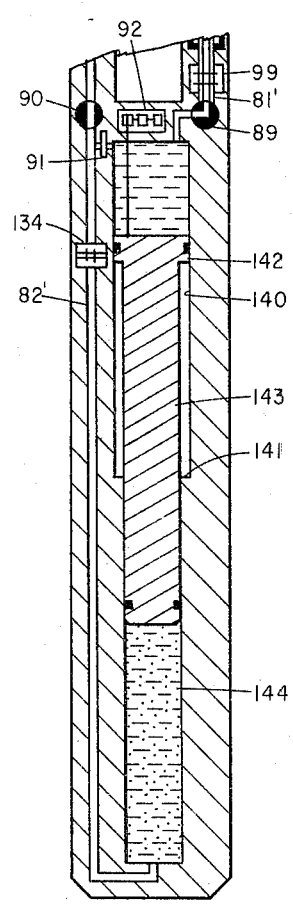

FIGURE 6 is a partial sectional view of still another fluid handling system embodiment which may be employed in the stead of the fluid handling system illustrated in connection with the apparatus of FIG. 1; and FIGURE 7 is a partial sectional view of still another fluid handling system embodiment which may be employed in the stead of the fluid handling system illustrated in connection with the apparatus of FIG. 1.

Figure 1:
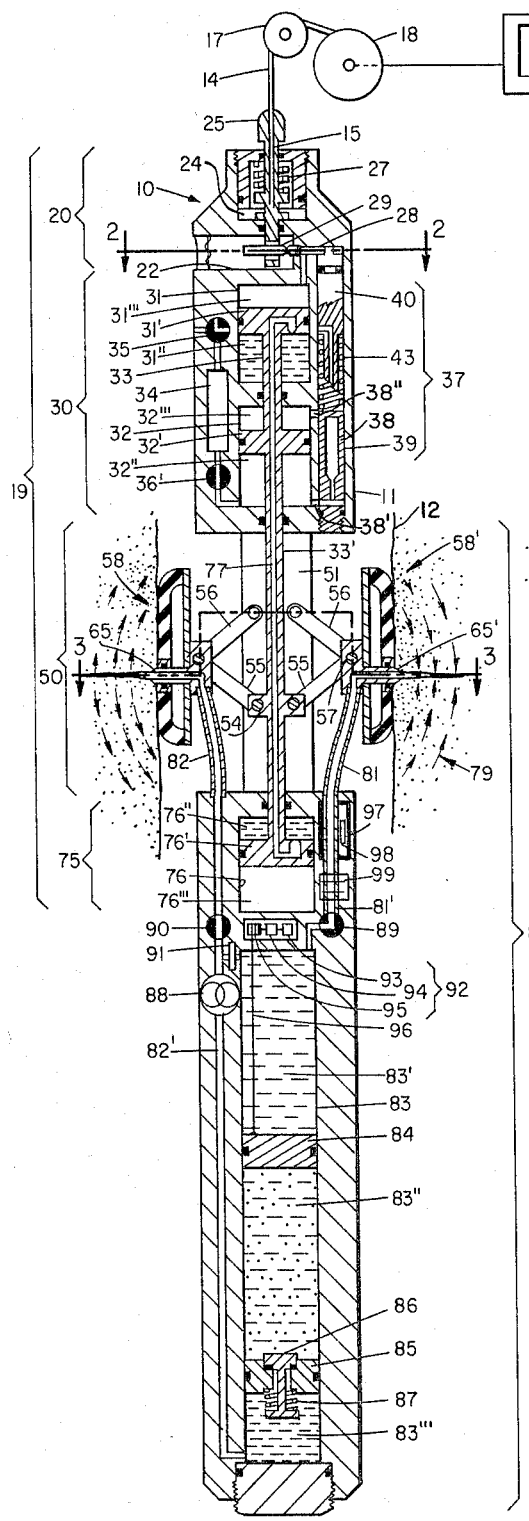
FIGURE 1 is a schematic illustration of formation investigation apparatus embodying the features of the present invention and showing the same actuated and otherwise disposed for conducting fluids to and from the adjacent formation.
Figure 2:
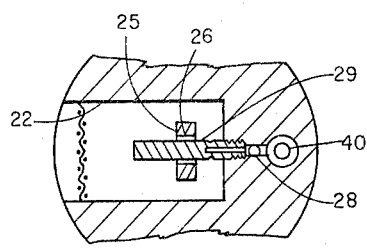
FIGURE 2 is a partial transverse sectional view taken along line 2—2 of FIG. 1.

Described generally, the formation investigation apparatus of the present invention as shown in FIG. 1, comprises a downhole unit generally indicated as 10 (and including a body 11) shown suspended from the earth's surface within the borehole 12 by means of a wireline 14 from a sheave 17 and winch 18. The downhole unit 10 is adapted for actuation under control from the earth's surface exerted over wireline 14 to move first and second wall engaging members, 58 and 58' respectively, into engagement with the wall of the borehole to respectively isolate first and second spaced-apart portions thereof from borehole fluids. Movement of the wall engaging members into engagement with the borehole wall is provided for by an actuation system adapted to displace the members outwardly with respect to the body 10 by an actuating stroke powered by a pressurized gas contained in the unit and to withdraw the members from the walls of the borehole by a retractive stroke which is powered by the pressure of the column of fluid which normally exists within the borehole. While the wall engaging members 58 and 58' are in engagement with the walls of the borehole establishing fluid communication therewith at spaced points, a fluid contained within the downhole unit 10 is injected into the formation within the area defined by wall engaging member 58 to establish a fluid flow within the formation toward a fluid sink or inlet element 65' of member 58' which is disposed to conduct fluid from the formation within the area defined by the wall engaging member 58' and thence, into a sample chamber provided in the downhole device. The flow of injection fluid within the formation displaces formation fluid ahead of it and produces a flow formation fluid into the sample chamber. The downhole unit is provided with instrumentation whereby measurements related to fluid flow within the formation may be obtained and transmitted to a recorder-indicator 16 at the earth's surface for indication and/or recording. These measurements, in being related to formation porosity and fluid permeability, extend the utility of the apparatus beyond that of a mere formation sampler or formation treatment device.

It is to be understood that the showing of the borehole 12 as an open hole is merely for purposes of illustration and that the downhole unit 10 is equally useful in cased boreholes provided wall engaging members suitable for employment therein are provided.

With further reference to the drawings, downhole unit 10 principally provides an actuator and actuator control system 19 and a fluid handling system 80. The actuator and actuator control system, housed in the upper part of the device, comprises a cable head section 20, a gas actuator section 30, a formation isolation section 50, and a hydraulic actuator section 75. The fluid handling system 80, although generally located in the lower portion of the device, overlaps the actuator and actuator control system 19 to include certain fluid line and instrumentation components disposed within the formation isolation and hydraulic actuator sections thereof.

*Actuator and actuator control system*

This system serves the purpose of moving the wall engaging members 58 and 58' into and out of engagement with the wall of the borehole under control exerted from the earth's surface over wireline 14. The particular system shown is a subject matter portion of a commonly assigned co-pending application of Robert G. Peter, for "Formation Fluid Sampler," Serial No. 247,067, filed December 26, 1962, now Patent Number 3,217,804 issued November 16, 1965. This particular actuator and actuator control system has been selected for inclusion here solely for the purpose of conveniently providing a complete operative device embodying the present invention, it being understood that no claim is made herein to any particular actuator and actuator control system. It will be appreciated that other suitable actuator and actuator control systems may be employed for this purpose instead of the system shown.

The cable head section 20 has as its functions the provision of means for attaching the downhole unit to its suspending wireline, the provision of means connecting electrical power and control circuits (not shown) within the downhole unit 10 to the central conductor 15 of wireline 14 and the provision of means for exerting surface control over certain functions of the downhole unit by mechanical tension signal transmitted over the wireline 14.

The body 11, within the portion defined by the cable head section 20, is provided with a longitudinally extending compartment 24 and a transversely extending bore 22. A cable socket member 25 extends in sealed slidable engagement through the compartment 24 and further into the transversely extending bore 22.

Both end portions of the cable socket member extend from the compartment 24 and are exposed to borehole fluids. These end portions are desirably of the same cross-sectional area in order that there will be no tendency for the socket 25 to be shifted because of the pressure exerted thereon by borehole fluids. A flange is provided on the socket member 25 which serves as a seat for a spring 27 which is maintained in biased relation between the flange and the upper end of the compartment 24. The spring 27 is of a size and bias such that it maintains the cable socket member in a normal position with the lower face of its flange in contact with the lower surface of the compartment 24 with a force in excess of that required to support the entire weight of the downhole unit 10.

The cable socket member 25 is provided at its lower end with a transversely extending bore 26 normally positioned in coaxial relation with the transversely extending bore 22. The bore 22 terminates at a blind end provided with a threaded coaxial receptacle which communicates with a fluid flow passageway 28 within the body 11. A break valve 29 is provided in sealed threaded engagement with the receptacle and extends therefrom into the bore 22 and through the bore 26 in the lower end of the cable socket member 25.

The cable socket member 25, in suspending the downhole device, normally imposes no load on the break valve. However, when the downhole unit 10 is in anchored engagement with the borehole wall and a predetermined upward tension in excess of the weight of the downhole device is applied from the surface over the wireline, the bias of spring 27 is overcome permitting the cable socket member 25 to move upwardly relative to the valve 29 and break the same and communicate the passageway 28 with borehole fluids within the transversely extending bore 22. As will appear from the description of the operation of the downhole unit 10, the breaking of valve 29 brings about the retraction sequence of the actuator system subsequent to a downhole operation.

The gas actuation section 30, disposed immediately below cable head section 20, has the function of providing force and power for urging the wall engaging members 58 and 58' of the formation isolation section against the walls of the borehole. Gas actuation section 30 includes a buffer fluid chamber 31 and a gas expansion chamber 32 spaced apart by an end wall common to both chambers. A piston 31' is disposed for sealed slidable engagement within the buffer fluid chamber 31 and a piston 32' is disposed for sealed slidable engagement within the gas expansion chamber 32. The pistons 31' and 32' are mechanically coupled by a rod 33 which extends in sealed slidable engagement through the common end wall. A rod 33′, an extension of rod 33, depends from the lower face of piston 32′ and extends through the lower end wall of the gas expansion chamber 32, in sealed slidable engagement therewith, where it is exposed to fluids of the borehole.

The piston 31′ defines a buffer fluid space 31″ at its rod end within the buffer fluid chamber 31 and a space 31‴ at its upper end which communicates with fluid flow passageway 28. The piston 32′ defines, at its lower end, a gas expansion space 32″ and, at its other end, a gas equalization space 32‴ within the gas expansion chamber 32. The function of these various spaces will be described hereinafter in connection with the description of the operation of the actuator and actuator control system 19.

A chamber 34 is provided within the body of the downhole unit 10 for receiving, through a charging valve 35, a predetermined amount of pressurized gas for powering the active stroke of the actuator system when the charge of gas is admitted to the space 32″. Although the passageway connecting chamber 34 with space 32″ is normally blocked by a setting valve 36′, the passageway is shown in FIG. 1 to be open and communicating gas to the space 32″. The setting valve 36′ may be of any type suitable for electrical remote control from the earth's surface.

A pilot operated equalization valve 37 is provided in the gas actuation section for the purpose of communicating the gas expansion space 32″ with the gas equalization space 32‴ pursuant to the breaking of break valve 29 during the retraction sequence of the operation of the device. Equalization valve 37 principally includes a plug member 39, defining, at its upper end, a perforatable diaphragm which normally blocks fluid communication between the spaces 32″ and 32‴; a diphragm perforator piston 40, normally exposed at its upper end to any fluid pressures existing in the passageway 28; and a valve spring 43 biased between the plug and the perforator piston to maintain their normal spaced relation. The valve bore 38 within which the plug member 39 is disposed communicates, by means of opening 38″ with the gas equalization space 32‴; and also such valve bore 38 communicates by means of opening 38′ with the gas expansion space 32″. Also the valve bore 38 communicates at its upper end with the previously described passageway 28.

When the valve 29 is broken, the pressure of borehole fluid is admitted to the upper end of diaphragm perforator piston 40 to force the same downwardly, overcoming the bias of valve spring 43, to breach the upper end wall of plug member 39 by forcing a sharpened tubular projection therethrough. When the equalization valve has thus been pierced, fluid communication is established from the gas expansion space 32″, through the plug member 39, and into the gas equalization space 32‴. Once this communication has been established, the pressure of the gas at either side of the piston 32′ is equalized and, thus, exerts no tendency to displace the piston one way or another. The operation of the equalization valve is part of the retraction sequence of actuator system and will be further described in connection therewith.

Within the formation isolation section 50, the body 11 bifurcates into laterally spaced longitudinally extending structural members 51, which define an open space therebetween for housing the wall engaging members 58 and 58′, as well as their actuating linkages, in their retracted disposition. The portion of rod 33′ which extends from the gas expansion chamber 32″, between the structural members 51 is provided with a cross head enlargement 54 which slidably engages longitudinal grooves provided in the structural members 51 to give lateral support to the otherwise substantially unsupported rod portion.

The wall engaging members 58 and 58′ are each mounted within the formation isolation section 50 by means of separate toggle linkages. The toggle linkage mounting the wall engaging member 58′, which is typical, is comprised of a pair of upper links 56, which are pin-connected at one end to the structural members 51, and a pair of lower links 55, which are pin-connected at one end to the cross head enlargement 54. The other ends of all four links comprising the toggle linkage are pinned together by a pin 57 to provide a knee joint of the toggle, as well as a connection with the associated wall engaging member 58.

When the cross head enlargement 54 is moved upwardly responsive to admission of the pressurized gas to gas expansion space 32″, the wall engaging members 58 and 58′ (which are normally maintained in proximity to the structural members 51) are displaced outwardly into engagement with the wall of the borehole by their respectively associated toggle mechanisms. The magnitude of the outward displacement of the wall engaging members is a function of the angle which the links 55 or 56 make with the rod 33′, as is the upward displacement of the rod and the volume of gas expansion space 32″. The pressure of a given quantity of gas in gas expansion space 32″ will, of course, reduce with increases in volume and the total vertical force on rod 33′ will be correspondingly reduced. This reduction in force applied to rod 33′ with vertical displacement is substantially compensated for by increases in the mechanical advantage of the toggle linkage with increases in the displacement of rod 33′, with the result that the forces urging the wall engaging members against the borehole walls are substantially constant over a considerable range of borehole sizes.

Figure 4:
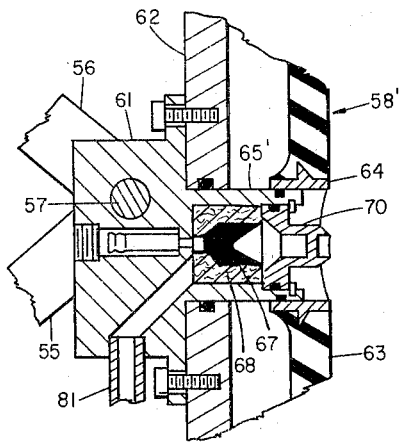
FIGURE 4 is a somewhat enlarged partial sectional view of a sidewall sealing member of the type illustrated in FIG. 1, illustrating the same as disposed during movement toward the sidewall of the borehole, but not yet engaged therewith.

The structure typical of wall engaging members 58 or 58′ is best shown in FIG. 4 wherein the member 58′ is shown connected to the links 55 and 56 of its associated toggle mechanism by means of a pin 57. In making this connection, the pin 57 extends through a jet charge carrier and fluid communication member 61, which comprises a portion of the wall engaging member 58′. The member 61 is fastened to a carrier plate 62 which, in turn, is connected at its peripheral edges with a sealing element 63 (desirably of resilient material) of generally curved configuration having a front face adapted to engage and isolate a portion of the borehole wall.

The member 61 in association with member 58′ is provided with a fluid communication extension, denominated as fluid inlet or sink 65′, which extends in sealed relation through the carrier plate 62 and in sealed slidable engagement within an insert 64, desirably molded in the material of the sealing element 63. The member 61 in association with the member 58 is also provided with a fluid communication extension which, although identical in form with the element 65′, is denominated as fluid injector 65 because of its function. The extensions each house a shaped explosive charge 67 and a holder 68 for positioning the charge therein. Although the holder 68 (desirably of compressible low density or porous material) initially fills the space between the exterior of the charge 67 and the walls of the extension, when the shaped charge is fired, by means of an electrically fired blasting cap, shock waves emanating from the charge radially compress the porous material of the holder outwardly against the walls of the extension to open a fluid flow passageway therethrough.

The distal end of the extension, either injector 65 or sink 65′, is counterbored to receive a closure member 70 which is adapted at its forward end for establishing fluid communication with an earth formation when urged thereagainst. The closure member is secured in its counterbore by means of a spring type locking ring.

When the wall engaging members 58 and 58′ are actuated, their respective sealing elements 63 contact the wall of the borehole with the force of the toggle mechanism which is sufficient to conform the elements 63 into sealing engagement with the borehole wall. In addition, the force of the toggle mechanism causes the extensions, either injector 65 or sink 65', to move relative to their respective inserts 64 and force their respective closure members 70 to penetrate the surface of the borehole wall. With the wall engaging members deployed in penetrating sealing engagement with the walls of the borehole, it is only necessary to fire the shaped charges 67, which perforate the closure members 70 and the formation therebeyond, in order to establish fluid communication from the formation through the members 61 and, thence, with flexible fluid inlet line 81 and fluid injection line 82 which comprise portions of the fluid handling system of the apparatus. Thus the extensions, both injector 65 and sink 65', together with their respectively associated shaped charges 67 and closure members 70, function as normally closed valves respectively controlling the commencement of fluid flow in the injection line 82 and inlet line 81.

Below formation isolating section 50, the longitudinal members 51 merge with a lower cylindrical portion of body 11 which houses the hydraulic power section 75. This section functions not only to power the toggle linkage in retracting the wall engaging members from the borehole wall, but, together with the chamber 31, functions as a shock absorbing system which moderates the shock forces incident to the setting and retraction of the wall engaging members. The hydraulic power section is principally comprised of a chamber 76 and a piston 76' in sealed slidable engagement therein. The rod 33' extends in sealed slidable engagement through the upper wall of the chamber 76 and is mechanically coupled to the piston 76'. The piston 76' defines, toward its rod end within the chamber 76, a space 76'' filled with a substantially incompressible fluid and, at its other end, a space 76''' containing a gas at negligible pressure. The space 76'' is communicated with space 31'' in the gas actuation section by means of a fluid passageway 77 which enables the incompressible fluid initially contained within the space 76'' to transfer between these spaces as the relative volumes thereof vary with the vertical displacement of the interconnected assembly comprised of the piston 31', rod 33, piston 32', rod 33', and piston 76'.

Assuming the downhole unit 10 has been lowered to a point within a borehole such that the wall engaging members are opposite a formation of interest, the actuating system 19 is actuated by opening the setting valve 36' pursuant to an electrical signal transmitted from the earth's surface over the wireline 14. The opening of the valve communicates the charge of gas within chamber 34 to the space 32'' to move piston 32' upwardly in response to the pressure of the gas. Pistons 31' and 76', which are interconnected with the piston 32' by rods 33 and 33', are also moved in an upward direction. With this movement, the cross head enlargement 54 is displaced upwardly from its initial position, into the position shown, to actuate toggle linkages and force the wall engaging members 58 and 58' into anchored and sealed engagement with the walls of the borehole 12 as shown in FIG. 1.

As the wall engaging members are moved into engagement with the borehole wall, the sealing elements associated with each will contact the wall first, being urged thereagainst by the carrier plates 63. The toggle linkages will continue to move the carrier plates outwardly and tend to compress and conform their associated sealing elements 63 into sealing engagement with the borehole wall. As the sealing elements 63 are compressed, the injector 65 or sink 65' will be moved with respect to its associated insert 64 and displace its associated closure member 70 beyond the sealing face to penetrate any borehole wall filter cake and the formation therebeyond. These penetrations define spaced points of fluid communication with the formation.

The fluid transfer phase of the downhole operation would be carried out next by means of the fluid handling system 80 (the operation of which will be described hereinafter), however, assuming for the present that such fluid transfer phase of the downhole operation has been completed, the wall engaging members of the downhole unit next must be disengaged from the borehole wall and retracted into their normal disposition adjacent the longitudinal members 51 before the downhole device can be withdrawn from the borehole.

To initiate the retraction of the actuator system 19, a predetermined tension is applied to the wireline 14 at the earth's surface which, in being resisted by the anchored engagement of the wall engaging members with the borehole wall, works to displace the cable socket member 25 upwardly to accomplish the breaking of the break valve 29. The breaking of the valve permits borehole fluid to communicate with the space 31''', the upper surface of the piston 31', and to the upper surface of the diaphragm perforator piston 40.

The borehole fluid pressure exerted on the piston 40 forces the same downwardly, compressing the valve spring 43, and causes the lower projection of the piston 40 to penetrate the upper end wall of the plug member 39. This penetration establishes a gas flow communication between the gas expansion space 32'' and the gas equalization space 32''' to equalize the pressure force of gas across piston 32'.

The force of borehole fluid pressure exerted on the top side of the piston 31' is communicated by the piston to the buffer fluid within the chamber 31''. This communicated pressure then causes the buffer fluid in space 31'' to transfer back over the restricted path 77 into the space 76' from whence it was displaced during the actuating stroke of the system. Because the buffer fluid contained below the piston 31' is substantially incompressible, no appreciable mechanical force is directly applied to this piston which is effective in motivating the retraction stroke of the actuator system. However, as the buffer fluid transfers back to the space 76'' responsive to the pressure created under the piston 31', the pressure in space 76'' builds up and acts on the top surface of the piston 76' to exert a tension force in the rod 33' which pulls the same and the cross head enlargement 54 thereof downwardly to retract the toggle linkages and the wall engaging members.

During the initial portion of the retraction stroke, the carrier plates 62 are moved with respect to their associated sealing members 63 to withdraw the injector 65 and inlet 65' from their associated inserts 65 sufficiently to break the fluid seal therebetween. The breaking of these fluid seals equalizes the pressure of the areas sealed off by the sealing elements with the pressure of borehole fluids and facilitates the retraction of the wall engaging members.

The acceleration or shock forces imposed on the actuation system by the movements of the various parts thereof, are limited in magnitude on both the actuating and retraction strokes by the metered transfer of the substantially incompressible buffer fluid over the passageway 77 between the spaces 31'' and 76''.

The retraction stroke of the actuating system just described completes the downhole operation so that the unit 10 may now be withdrawn from the borehole by means of the wireline 14.

*Fluid handling system of FIG. 1*

Fluid handling system 80 functions to inject a supply of fluid contained within the downhole unit into the formation within the area defined by the wall engaging member 58 where it, in turn, motivates a flow of formation fluid within the formation toward a location defined by the wall engaging member 58' and, thence, into the body of the downhole unit 10 to effectuate an exchange of injection fluid for formation fluids. The fluid handling system is provided with suitable valves for controlling this exchange from the earth's surface, as well as instrumentation for measuring pressures and the amount of fluid displaced in the exchange. The fluid handling system is also provided with detection units for discriminating injection fluids from the fluids originally within the formation about the borehole.

The fluid handling system is principally comprised of a fluid cylinder 83 provided in the body of the downhole unit 10. The cylinder is communicated at its upper end with the inlet or sink element 65' of wall engaging member 58' by means of inlet line 81 and passageway 81'. The injector element 65 of wall engaging member 58 is connected by means of injection line 82 and injection passageway 82' to the lower end of the cylinder 83. These elements, including the cylinder 83, interconnecting the injector element 65 with the inlet or sink element 65' comprise the principal fluid flow passageway of the fluid handling system.

A fluid separator piston 84 is provided in sealed slidable engagement with the walls of the cylinder 83, and defines, with the upper end of the chamber, a fluid inlet portion 83'. A second fluid separator piston 85 is provided in sealed slidable engagement with the walls of the cylinder 83 and is located between and spaced from both the piston 84 and the lower end of the cylinder. The piston 85 defines, between its lower surface and lower end of cylinder 83, a first injection fluid portion 83'''. Piston 84 and 85 are spaced apart within the cylinder by intervening fluid to define a second injection fluid portion 83''. Although the pistons 84 and 85 are shown displaced in the cylinder 83, they are initially disposed with the piston 84 quite near the upper end of the cylinder 83 such that the inlet fluid portion 83' is initially of negligible volume. In this initial disposition, the sum of the volumes of the first and second injection fluid portions 83''' and 83'' is substantially equal to the total volume of the cylinder 83. The piston 84 is maintained in this initial position by the incompressible injection fluid in the second injection fluid portion 83'' and the piston 85 which are, in turn, maintained in their respective initial dispositions by the quantity of injection fluid initially within the first injection portion 83'''.

The pistons 84 and 85 may be described as being free within the cylinder 83 in that, although they isolate adjacent fluid portions of the cylinder from one another, they communicate pressures thereacross and move within the cylinder 83 responsive to fluid movements therein as fluid "flows" within the principal flow passageway of which the cylinder constitutes a portion.

The injection fluid portions 83''' and 83'' may be respectively filled with a radioactively tagged fluid such as oil and a radioactively tagged salt water solution if it is desired that the formation investigation be conducted with fluids of different viscosity. However, any suitable fluids having detectable characteristics different from that of the formation fluids and one another may be used for injection purposes, provided appropriate detectors are incorporated within the downhole unit to enable discrimination between all the various fluids. Of course, there may be circumstances wherein it is unnecessary or undesirable to employ more than a single injection fluid and, in such a case, the piston 85 may be removed from the apparatus to provide a larger volume of a single radioactively tagged injection fluid.

The piston 85 is equipped with a coaxially disposed valve 86 which is normally held in closed condition by the bias of a spring 87. As may be seen from FIG. 1, the lower portion of the valve 86 extends below the lower surface of the piston 85 such that, when the piston contacts the lower end of the cylinder 83, the valve 86 will be stopped first in its traverse and the body of the piston will continue downwardly with the result that the bias of the spring 87 is overcome and the valve is unseated. The second injection fluid is then communicated through the piston to the lower end of the cylinder 83 and thence into the injection passageway 82'.

A pump 88 is provided in injection fluid passageway 82' for the purpose of exerting a fluid pressure differential within the principal flow passageway. This pressure differential is effective to inject the injection fluid into the formation at the injector 65 of wall engaging member 58, as well as to lower the pressure in the inlet or sink element 65' of the wall engaging member 58' so that formation fluids will flow from the formation into the inlet line and thence into the cylinder 83 above the piston 84. The magnitude of pressure differential required to produce a given flow rate is a function of formation permeability and, thus, will vary widely from formation to formation. The pump 88, although shown schematically as being of the gear type, may be of any suitable type. The pump is powered by a motor which is operable responsive to electrical power communicated to the same from the earth's surface over the wireline 14.

The principal flow passageway is initially blocked at either end by the closure member 70 associated with each of the injector 65 and sink 65'. Inlet passageway 81' and injection passageway 82' are respectively provided with normally open valves 89 and 90. These valves function to shut-in the passageways 81' and 82' in response to electrical signal communicated from the earth's surface over wireline 14 at the completion of a fluid handling or transfer phase of a downhole operation. Although the valves 89 and 90 may be of any suitable remotely controllable type, a normally-open, electrically initiated, fluid pressure actuated valve of the type disclosed in commonly assigned Patent Number 2,892,130 to McMahan has been found to be satisfactory.

A differential pressure transducer 91 is provided which has a pair of pressure taps, one communicating the transducer with the injection passageway 82' on the high pressure side of the pump 88 and the other communicating the transducer with the upper end of the cylinder 83. A differential pressure transducer suitable for this application is offered by Colvin Laboratories, Inc., East Orange, New Jersey, as their Series 842. The function of the differential pressure transducer is to measure and transmit to the surface an electrical signal representative of the differential pressure developed by the pump 88. The measurement is recorded at the surface with respect to time in a manner well-known in the art to provide a record of the pressure differential exerted on the formation between the injector 65 and the inlet or sink element 65'.

A piston displacement sensing device, generally indicated by reference numeral 92, is provided within the body 11 for the purpose of measuring the vertical disposition of the piston 84 in the cylinder 83 and providing an electrical signal representative of such measurement for transmission to the earth's surface where it is also recorded with respect to time. The piston sensing device is comprised of a rotary potentiometer 93, the shaft of which is resiliently biased toward a first or zero rotational position by means of a torsion spring unit 94, and a pulley 95 mounted on the potentiometer shaft. The pulley has wound thereon a number of wraps of an actuation cable 96 which, at one end, is fixed to the pulley adjacent the rim thereof. At its other end, the actuation cable extends through the upper end wall of the cylinder 83 and is connected with the piston 84. With this arrangement, displacement of the piston 84 responsive to fluid flowing into the inlet fluid portion 83' exerts a pull on the cable which unwinds from and rotates the pulley 95. As the cable unwinds and the potentiometer 93 consequently rotates against the resistance of the torsion spring unit 94, the electrical resistance of the potentiometer is varied in a substantially linear manner with the change in disposition of the piston 84.

The passageway 81' includes a tubular section which extends through a radioactively shielded compartment 97 provided in the body 11. A radioactivity detector unit 98 (a G.M. tube, for example) is housed within the shielded compartment, such that the detector will detect radiation emanating from fluid flowing within the passageway 81' to the exclusion of any external or natural source of radiation. The detector output indications of radiation intensity are transmitted to the surface for recording.

A resistivity cell 99 is provided within the body 11 such that the resistivity of fluid flowing within the passageway 81' may be continuously determined. The resistivity cell, shown somewhat schematically in FIG. 1, is comprised of a pair of electrodes exposed in an insulated portion of the passageway 81' such that any current passing between these electrodes must pass through the fluids flowing therebetween within the passageway. Variations in the resistance of the flowing fluid causes variation in voltage in accord with the resistivity of the fluid. The resistivity indicating voltage is transmitted to the surface for recording.

The outputs of the various detector and measurement devices are transmitted to the surface, and the various control valves of the downhole unit are remotely operated from the surface by means of a telemetry and control system, the electrical details of which have been omitted since such systems generally are well known in the art as exemplified by the system described in commonly assigned Patent Number 2,982,130 for "Well Formation Testing Apparatus" granted to McMahan May 2, 1961.

*Operation of fluid handling system of FIG. 1*

Assuming that the downhole unit 10 has been lowered into the borehole opposite a desired formation and that the actuator section has been operated, as has been described, to define first and second points of fluid communication with the formation comprising the walls of the borehole, and, further assuming that the cylinder 83 had been previously and properly loaded with the desired injection fluid or fluids, the fluid handling phase of the downhole operation would be commenced by the firing of the shaped explosive charge 67 associated with each of wall engaging members 58 and 58'. The firing of the charges accomplishes the jet penetration of the closure member 70 associated with each of wall engaging members 58 and 58', and further accomplishes penetration of the formation therebeyond. Simultaneously with the penetrations, the shaped charges 67 operate to open fluid communication from the formation to inlet lines 81 and injection line 82. With communication thus established, formation fluids will enter the fluid handling system to raise the pressure therein to formation pressure, but no flow beyond that to accomplish pressure equalization will ensue.

The actual fluid handling phase of the operation would next be started by energizing a circuit at the earth's surface to start the electric motor which runs the pump 88. The operation of the pump will create a differential pressure in the principal flow passageway which raises the pressure in the injection line 82 above the pressure of the formation and which drops the pressure in the cylinder 83, connecting passageway 81' and inlet line 81 to a pressure less than the pressure of the fluid within the formation. This creates within the formation, between the points of fluid communication, a differential pressure (actually a pressure gradient) such as to induce a flow of fluid within the formation between the injector element 65 and the inlet or sink element 65'. The formation flow is accompanied by a flow of similar magnitude within the fluid handling system of unit 10.

Figure 3:
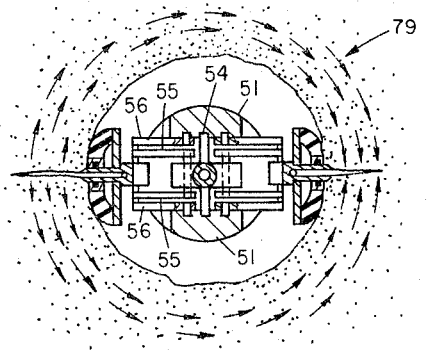
FIGURE 3 is a transverse sectional view taken along line 3—3 of FIG. 1 and showing the disposition of the wall engaging members of the apparatus with respect to the wall of the borehole.

Thus, as fluid is introduced into the formation through the injection line 82, a similar amount of fluid is received into the fluid handling system via inlet line 81 and passageway 81' into the inlet fluid portion 83' of cylinder 83. As this flow commences and continues, injection fluid will be withdrawn from the portion 83''' and formation fluids will flow into the inlet portion 83' at the same rate. The movement of fluid within the cylinder 83 is in the nature of a "flow" in that it displaces the piston 84 in proportion to flow volume. Another way of viewing the flow established in the formation is that the injection fluid, in flowing thereinto, displaces or sweeps formation fluids from within an envelope of formation (generally indicated as 79 in FIGS. 1 and 3) defined by the flow about the borehole and causes fluids originally in place within this envelope to flow toward and into the fluid inlet or sink element 65'.

As has been brought out, a "flow" is established in the principal flow passageway which is equal to and contemporaneous with the flow established within the formation. The flow within the cylinder 83, a portion of the principal flow passageway, displaces pistons 84 and 85 in a downward direction at a rate proportional to the rate of flow within the formation. The displacement of piston 84, a function of the volume of fluid which has entered the fluid inlet portion 83', is sensed by the piston sensing device 92 and transmitted to the earth's surface where it is recorded with respect to time. The slope of the volume versus time curve is, of course, the instantaneous flow rate of the fluids being transferred, both within the principal flow passageway and within the formation.

As the flow in the formation continues and the first injection fluid portion 83''' becomes smaller and smaller by virtue of the first injection fluid therein being depleted, the piston 85 will approach the bottom end of the cylinder 83. When the piston contacts the bottom, the valve 86 in the piston will open as previously indicated to communicate the second injection fluid to the low pressure side of the pump 88. The pump, in continuing to operate, withdraws the second injection fluid from portion 83'' and injects the same into the formation following the fluid from the portion 83'''. As the injection fluid is depleted from portion 83'', the piston 84 will move downwardly with respect to the bottomed-out piston 85. All this while, a flow is being maintained in the formation and formation fluid continues to enter the space 83'.

When formation fluids have been substantially displaced from the flow envelope, the first injection fluid will commence entering the inlet or sink 65' and will be detected by one or more of the detection units in flow passageway 81'. The volume of fluid injected, as of the time of the first arrival or detection of the first injection fluid, for example, is the volume of the interconnected pore space of the formation encompassed within the envelope.

As between formations which are isotropic, homogeneous and of comparable thickness, the flow envelope volume for a given injector and sink spacing is of substantially the same size and geometry, even though the various formations may differ in interconnected pore space volume. This fact enables the volume of the flow envelope for a given device, hole size and formation thickness to be determined from a calibrating injection operation performed in a borehole piercing a formation zone of known thickness and of known percentage interconnected porosity. The thickness of the zone may be determined from an electrical log of the borehole, for example, and the borehole size is known, of course. The percent interconnected pore space volume of the zone may be determined by laboratory methods from a core sample previously taken from within the zone during the drilling of the borehole.

The terms "percentage interconnected porosity" or "percent interconnected pore space volume" have reference of course to the permeability or porosity of the formations and may be defined generally as a ratio of percentage which is the total volume or total space of channels through which fluid is capable of flowing divided by the entire volume of the material containing such channels.

A suitably tagged injection fluid is injected into the zone of known porosity and the total volume of fluid injected as of the time of detection of the first arrival, for example, of injection fluid in the inlet line is obtained from the recording of volume versus time. This volume is also the volume of the interconnected pore space incompassed within the envelope. The volume of the formation envelope may then be obtained by dividing this measurement of the pore space volume of the formation defined within the envelope by the percent interconnected porosity (expressed as a decimal figure) of the zone as determined from the core sample.

With the envelope volume thus determined, the percent interconnected porosity of other and unknown formations may be determined by measuring the total interconnected pore space volume of the unknown formation within the envelope by conducting injection operations therein and then comparing the total interconnected pore space volume with the envelope volume (determined as described above).

In addition to enabling the determination of the percent interconnected or effective porosity of formation zones about a borehole in the manner just now pointed out, the device of the invention enables the determination of the permeability of the unknown formation, as will appear. In making permeability determinations from information obtained with the system and apparatus of the invention, the D'Arcy equation, $$Q = \frac{K(A/L)P}{Z}$$

is employed. In this expression, Q is the instantaneous rate of flow; P is the differential pressure; Z is the viscosity of the flowing liquid; K is the coefficient of permeability; and $(A/L)$ is a constant (length units) determined by the geometry of the flow channel. The system of the invention, in performing a fluid injection, measures and records Q (the slope of the volume versus time curve) and P. The viscosity Z of the injection fluid will be known, and $(A/L)$ will be constant in value for a given flow channel geometry which is comparable to the geometry of the previously referred-to envelope.

The value of the constant $(A/L)$ for a given flow channel geometry may be evaluated from additional data obtained in the previously referred-to calibrating injection operation. The calibrating borehole will be of known size and the formation zone will be of known thickness and permeability. The permeability may be determined by laboratory measurement of the previously referred-to core sample. During the conduct of the calibrating injection operation, the values of Q and P would desirably be taken when the fluid flowing within the envelope or flow channel was injection fluid, to the substantial exclusion of other fluids, as indicated by the measured radiation intensity of the fluid in the inlet line 81. With these values of Q and P, and knowing K for the formation zone and Z for the injection fluid, the D'Arcy equation is employed to evaluate the constant $(A/L)$.

Having evaluated $(A/L)$ and knowing Z, Q and P for an unknown formation, the permeability, K, of the unknown formation may be computed by solving for the same in the D'Arcy equation.

The D'Arcy equation strictly applies only under conditions of viscous flow for a single fluid. For this reason, whenever flow rate measurements are being taken with the downhole device, the injection pump should (for highest accuracy) be operated at speeds (or pressure differentials) such that the ensuing flow within the interconnected pore spaces of the envelope or flow channel may be said to be of a percolating nature. Further as has been mentioned, the values of P and Q should be taken at a time when only a single fluid is flowing in the flow channel, i.e., at a time when the fluid previously in place has been substantially purged from the envelope.

To fully calibrate the downhole unit, envelope volumes and the constant $(A/L)$ for formation flow channels defined thereby should be obtained for a variety of zone thicknesses and borehole sizes. Injection operations similar to the one just now described would be carried out in a number of formation zones varying as to zone thickness and as to the size of the borehole penetrating the same. Once ascertained, the values of envelope volume and the constant $(A/L)$ for the varied situations may be employed to appropriately match the zone thickness-hole size situation which may be encountered in later injection-testing of unknown formations. The matching of the thickness and hole size from an unknown formation with the thickness and hole size from which these constants were previously obtained is enabled by the fact that the borehole size and zone thickness is readily ascertained from electrical and caliper logs of the unknown borehole.

*Alternate fluid handling system embodiments*

Figure 5:
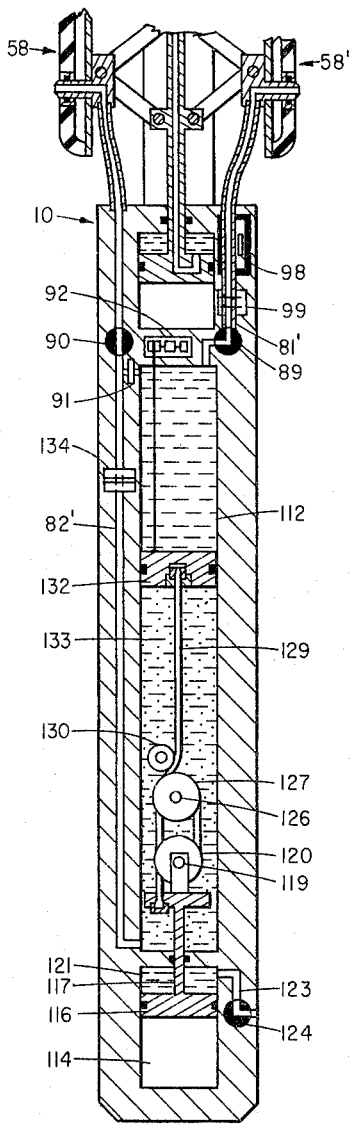
FIGURE 5 is a partial sectional view of a fluid handling system embodiment which may be employed instead of the fluid handling system illustrated in connection with the apparatus of FIG. 1.

The fluid handling systems of FIGS. 5, 6 and 7 may be employed in lieu of the system shown in connection with FIG. 1 whenever it is desired that the power for motivating a fluid injection operation be obtained from a downhole source to thus render the injection operation independent of electrical power transmitted over the wireline from the earth's surface. These alternate systems are provided with the same instrumentation and generally the same control elements as the embodiment of FIG. 1 and, further, commonly employ a number of other elements which have been described in connection with the description of FIG. 1. The same reference numerals will be applied to the commonly employed elements in all the alternate embodiments to simplify the descriptions thereof.

The embodiment of FIG. 5 is adapted to motivate the injection operation by application of the pressure force of borehole fluids. In this embodiment the lower portion of the downhole unit 10 is provided with a longitudinally extending cylinder 112 which communicates at its upper and lower ends respectively with inlet passageway 81' and injection passageway 82'. A power cylinder 114 is provided below the cylinder 112 in spaced alignment therewith. A power piston 116 is disposed in sealed slidable relations to the cylinder 114 and has a piston rod 117 extending in sealed slidable relation through the upper end wall of the cylinder 114 into the cylinder 112. The upper end of the rod 117 is provided with an enlargement providing a mounting for a horizontally disposed shaft 119 upon which a plurality of pulleys 120 (only one of which is visible in the figure) are mounted for rotation. The power piston 116, in its normal or unactuated disposition, is disposed near the upper end wall of the cylinder 112, but slightly spaced therefrom to define a power fluid space 121 between the upper surface of the power piston and the upper end wall of the cylinder. A fluid passageway 123, normally blocked by a valve 124, fluidly communicates the space 121 with the fluids of the borehole. The space below the piston 112 is filled with gas at substantially atmospheric pressure.

A fixed horizontal shaft 126 is provided within the cylinder 112 at a point suitably vertically spaced from the uppermost position of the movable horizontal shaft 119. A plurality of pulleys 127 (only one of which is visible in the figure) are mounted for rotation on the fixed shaft 126. A cable 129 is suitably socketed in the enlargement of the rod 117 and is thence wrapped about one of the pulleys 127 and then alternately about a pulley 120 and a pulley 127, and so on, to comprise a multi-fall tackle system. After passing partially over the last pulley 127, the cable is centralized within the cylinder 112 by means of an idler pulley 130 mounted on a horizontal shaft in fixed relation to the cylinder 112. The upper end of the cable 129 socketed in the center of a piston 132 which is mounted in sealed slidable engagement with the cylinder 112.

In the normal or unactuated disposition of the fluid handling system of FIG. 5, the power piston 116 is in its uppermost position and maintains the pulleys 120 in closely spaced proximity to the pulleys 127. In this disposition the falls of the tackle system require the least amount of cable length and allow sufficient slack in the cable so that the piston 132 is disposed quite near the top end of the cylinder 112, it being held there by substantially incompressible injection fluid 133 filling the cylinder 112 therebelow.

Presuming the downhole device has been lowered into the desired position in a borehole and that the wall engaging members 58 and 58' have been set as previously described, the valve 124 would be opened in response to electrical signal communicated from the earth's surface to initiate the fluid injection phase of the operation. As the valve 124 is opened, borehole fluid is admitted to the chamber 121 and the force of hydrostatic pressure is exerted on the top of piston 116. This force, which is opposed only by the negligible gas pressure in the power cylinder on the lower side of the piston 116, operates to displace the piston 112 and rod 117 downwardly, with the result that pulleys 120 move relative to the pulleys 127 to increase the spacing therebetween. This increase in pulley spacing increases the length of cable required for the falls of the tackle system and results in the piston 132 being pulled downwardly within the cylinder 112. The downward movement of the piston 132 operates to displace the injection fluid 133 out through the injection passageway 82' and injection rate metering choke 134 and into the formation at a point defined by the wall-engaging member 58. The choke 134, by limiting the fluid injection rate, serves to desirably limit flow rates within the formation envelope.

The injection into the formation causes a fluid transfer movement therewithin about the borehole with the result that formation fluids are drawn into the cylinder 112 above the piston 132 to accomplish the same general result as has been described in connection with the operation of the embodiment of FIG. 1.

It is to be noted that the multi-fall tackle system is a motion amplifying system which imparts a large stroke to the piston 132 in response to a relatively short movement of the power piston 116. This amplification of motion enables the provision of a downhole unit of relatively high injection fluid volume capacity as compared to its overall length, a relationship important in minimizing tool length.

The fluid handling system of FIG. 6 is generally similar to the system of FIG. 5, but differs therefrom in that it is provided with a self-contained source of injection motivating power. The embodiment of FIG. 6 is provided with a power fluid storage chamber 135 which is fluidly communicated with chamber 117 by means of a passageway 136, normally blocked by an electrically controlled valve 137. The storage chamber 135 would normally be charged with gas at desired pressure through a charging cock 138 at the earth's surface before the downhole device is lowered into the borehole.

In operation, the system of FIG. 6 is identical with that previously described in connection with FIG. 1, as modified by the description of the operation of the system of FIG. 5, but with the injection phase of the operation being powered by the pressurized gas contained in the chamber 135. When the valve 137 is opened responsive to electrical signal from the earth's surface, the pressure of the stored gas is admitted to the space 121 above the piston 117 and operates to force the same downwardly with an ensuing displacement of the piston 132. Inasmuch as the pressure of stored gas is utilized to motivate the injection phase of the downhole operation, the injection operation is rendered independent of the pressure of the borehole environment. Thus, when the system of FIG. 6 is employed in connection with an actuator and actuator control system likewise operable independently of the pressure of the borehole environment, the resulting downhole device has expanded utility in that it may be practically employed in gas-filled low pressure boreholes, for example.

The fluid handling system embodiment illustrated in FIG. 7 extracts the necessary power for motivating the injection operation from the fluid pressure existing within the formation about the borehole. Thus the system of FIG. 7 does not depend on borehole pressure nor does it have any need for a self-contained power source.

The body of the downhole unit shown in FIG. 7 is provided with a vertically extending bore 140 which, at its lower end, communicates with the injection passageway 82' and, at its upper end, communicates with the inlet passageway 81'. The bore 140 is reduced in diameter at a shoulder 141, located at approximately midlength to define an upper portion thereof, having a diameter somewhat larger than that of the lower portion thereof. A piston 142 is provided in sealed slidable engagement within the upper portion of the bore 140. This piston is provided with a piston rod 143 extending downwardly with its lower end provided with a fluid seal for sliding engagement within the lower, reduced diameter portion of the bore 140. The piston 142 and rod 143 are initially positioned within the bore 140 such that the top face of the piston 142 is in closely spaced relation to the upper end wall of the bore 140 defining an inlet fluid chamber of negligible volume in connection with the inlet passageway 81'. In the initial position of the piston 142, the lower end of the rod 143 projects into the lower or reduced diameter portion of the bore 140 only to the extent necessary to establish a fluid seal with the walls thereof. The reduced diameter portion of the bore 140 below the rod 143 is initially filled with a suitably tagged injection fluid 144.

With the piston 142 and rod 143 in their initial or uppermost positions, an annular space is defined between the surface of the rod 143 and the walls of the bore 140 and extends between the lower surface of the piston 142 and the shoulder 141. The annular space is filled with a gas at negligibly low pressure so that as the annular space contracts in volume responsive to downward motion of the piston and rod in the bore 140, no substantial resistance to such movement arises from compression of the gas.

Assuming that the wall engaging members 58 and 58' have been actuated and are in anchored sealing engagement with the walls of the borehole, it is only necessary to fire the shaped charges associated with the wall engaging members in order to set the fluid handling system of FIG. 7 into operation. When the inlet and injection passageways are communicated with the fluid of the formation surrounding the borehole, formation pressure is admitted to both the upper surface of the piston 142 and to the lower end surface of the rod 143. Although the unit pressure initially exerted at the upper end of the piston 142 and the lower end of the rod 143 is substantially the same, the total force exerted on the top surface of the piston 142 (the product of the unit pressure and the piston area) is substantially greater than the force exerted upwardly on the lower end of the rod (the product of the unit pressure and the area of the rod). The upward and downward forces thus exerted on the piston and rod assembly have a net or resultant downwardly directed force which operates to displace the piston and rod downwardly in the bore 140 and cause the injection fluid below the rod to be forced out into the formation via the injection passageway 82'. Another way of viewing the mechanics causing the injection is that the net or resultant force exerted on the injection fluid below the rod 143 raises the pressure intensity thereof to a level exceeding the pressure of formation fluids by an amount necessary to carry out the required injection.

Thus, it has been seen that the present invention provides a new method and new apparatus useful in the investigation of earth formations surrounding a borehole. Further, it has been seen that the information obtainable from the measurements made and recorded by the system of the invention are of value in evaluating the productive potential of a formation surrounding a borehole. Also it has been seen that the sidewall sealing difficulties generally associated with prior art fluid handling equipment have been minimized.

As various changes may be made in the form, construction and arrangement of the elements herein disclosed without departing from the spirit or scope of the invention, and without sacrificing any of its advantages, it is to be understood that all matters herein are to be interpreted as illustrative and not in any limited sense.

What is claimed is:

1. A device for investigating the character of an earth formation traversed by a borehole comprising: a support adapted to be located at desired depth within a borehole opposite a formation to be investigated; a chamber in said support containing a first fluid distinctive from fluids saturating the formation about the borehole; a first means mounted on said support for isolating a first borehole wall formation portion from borehole fluids and for establishing fluid communication with said formation portion when engaged therewith; a second means mounted on said support for isolating a second borehole wall formation portion from borehole fluids and for establishing fluid communication with said second formation portion when engaged therewith; motive means in said body for moving said first and second means into engagement with the wall of the borehole at locations spaced from one another; first and second fluid channels respectively communicating between said first means and said chamber and between said second means and said chamber; means in said support for inducing said first fluid to displace from said chamber via said first channel and first means into the formation at said first borehole wall formation portion, within said information between said spaced locations and back through said second means, said second fluid channel, and into said chamber; means in said support for measuring the quantity of said first fluid displaced from said chamber at any point of time; and means in said second channel for detecting the arrival time of said first fluid within said second channel, said quantity at said arrival time being a measure of the volume of formation fluids displaced by said first fluid and hence a measure of the permeability of the formation under investigation.

2. A device for investigating the character of an earth formation traversed by a borehole containing a column of fluid comprising: a support adapted to be located at a desired depth within a borehole opposite a formation to be investigated; a chamber in said support containing a first fluid; a first means mounted on said support for isolating a first borehole wall formation portion from borehole fluids and for establishing fluid communication with said formation portion when engaged therewith; a second means mounted on said support for isolating a second borehole wall formation portion from borehole fluids and for establishing fluid communication with said second formation portion when engaged therewith; motive means in said support for moving said first and second means into engagement with the wall of the borehole at locations spaced from one another; first and second fluid channels respectively communicating between said first means and said chamber and between said second means and said chamber; a piston in sealed slidable engagement within said chamber intermediate said first and second fluid channels; and a second motive means in said support for displacing said first fluid from said chamber via said first channel and first means into the formation at said first borehole wall formation portion, and thence, within said formation between said spaced locations through said second means and into said second fluid channel in response to control from the earth surface.

3. The device of claim 2 wherein said second motive means comprises a cylinder in said support, a power piston in sealed slidable engagement in said cylinder, a piston rod extending from said power piston in sealed slidable engagement through an end wall of said cylinder into said chamber and connected with the first-mentioned piston, and means in said support for applying the force of said column of fluid to said power piston to effectuate movement thereof.

4. The device of claim 2 wherein said second motive means comprises a cylinder in said support, a power piston in sealed slidable engagement in said cylinder, a piston rod extending from said power piston in sealed slidable engagement through an end wall of said cylinder into said chamber and connected with the first-mentioned piston, a source of pressure fluid in said support and means in said support for communicating said pressure fluid to said cylinder and power piston to effectuate movement of said power piston responsive to signal communicated from the earth surface.

5. A device for treating an earth formation traversed by a borehole comprising: a support adapted to be located at a desired depth within a borehole opposite a formation to be treated; a first means mounted on said support for isolating a first borehole wall formation portion from borehole fluids and for establishing fluid communication with said formation portion when engaged therewith; a second means mounted on said support for isolating a second borehole wall formation portion from borehole fluids and for establishing fluid communication with said second formation portion when engaged therewith; motive means in said support for moving said first and second means into engagement with the wall of the borehole at locations spaced from one another; a cylinder in said support connected at a first end portion thereof with said first means by means of a first fluid channel and connected at a second end portion thereof with said second means by means of a second fluid channel; a first piston in sealed slidable engagement within said cylinder initially disposed adjacent said second end portion of said cylinder; a second piston in sealed slidable engagement within said cylinder initially disposed in spaced relation to said first piston; a first fluid in said cylinder intermediate said second piston and said first end portion of said cylinder; a normally closed valve in said second piston adapted to open fluid communication therethrough when said valve is displaced relative thereto after a predetermined quantity of said first fluid has been moved from said cylinder; a second fluid in said cylinder intermediate said first and second pistons; and a second motive means in said support for moving said first fluid from said cylinder via said first channel and first means into the formation at said first borehole wall formation portion and for moving said second fluid from said cylinder via said first channel and first means into the formation subsequent the movement of said predetermined quantity of said first fluid from said cylinder and the consequent opening of said valve.

6. A device for investigating the character of an earth formation traversed by a borehole comprising: a support adapted to be located at desired depth within a borehole opposite a formation to be investigated; a chamber in said support containing a first fluid; a first means mounted on said support for isolating a first borehole wall formation portion from borehole fluid and for establishing fluid communication with said formation portion when engaged therewith; a second means mounted on said support for isolating a second borehole wall formation portion from borehole fluid and for establishing fluid communication with said second formation portion when engaged therewith; motive means in said support for moving said first and second means into engagement with the wall of the borehole at locations spaced from one another; first and second fluid channels respectively communicating between said first means and said chamber and between said second means and said chamber; and a piston in said chamber for displacing said first fluid from said chamber via said first channel and first means into the formation at said first formation wall portion, to cause a flow of formation fluids within said formation between said spaced locations and into said second means and said second fluid channel.

7. A device for sampling the fluid content of an earth formation containing fluids under pressure and traversed by a borehole comprising: a support adapted to be located at a desired depth within a borehole opposite the formation from which a fluid sample is to be obtained; a first means mounted on said support for isolating a first borehole wall formation portion from borehole fluids and for establishing fluid communication with said first borehole wall formation portion when engaged therewith; a second means mounted on said support for isolating a second borehole wall formation portion from borehole fluids and for establishing fluid communication with said second borehole wall formation portion when engaged therewith; motive means in said support for moving said first and second means into engagement with the wall of the borehole at locations spaced from one another; a low pressure cylinder in said support for receiving a sample of formation fluid; a chamber in said support containing a fluid for injection into said formation; first and second fluid channels respectively connecting said chamber to said first means and said second means to said low pressure cylinder; a piston in sealed slidable engagement within said low pressure cylinder; a rod connected with said piston and extending in sealed slidable relation within said chamber; and means for selectively communicating formation fluid under formation pressure over said second channel to said low pressure cylinder behind said piston, whereby the pressure of formation fluid displaces the same and said rod relative to said support to generate a pressure within said injection fluid in excess of the pressure of formation fluid and establish a flow of injection fluid out of said chamber via said first channel, and first means and into the formation at the first borehole wall formation portion at a rate proportional to the rate of displacement of said piston and rod.

8. A device for obtaining the samples of fluid contained under pressure within an earth formation traversed by a borehole comprising: a support adapted to be located at a desired depth within a borehole opposite a formation from which a fluid sample is to be obtained; means mounted on said support for isolating first and second spaced borehole wall formation portions from borehole fluids and for establishing first and second spaced points of fluid communication with said formation respectively at said first and second borehole wall formation portions when engaged therewith; motive means in said support for moving the first mentioned means into engagement with the wall of the borehole; a low pressure cylinder in said support for receiving a sample of formation fluid; a chamber in said support containing a fluid for injection into said formation; first and second fluid channels respectively connecting said chamber with said first point of fluid communication and said second point of fluid communication with said low pressure cylinder when said means is in engagement with the borehole wall; a piston in sealed slidable relation within said low pressure cylinder; a rod connected with said piston and extending in sealed slidable relation within said chamber; and means for selectively admitting formation fluid at said second point of fluid communication over said second channel to said low pressure cylinder behind said piston, whereby the pressure of formation fluid displaces the same and said rod relative to said support to generate a pressure within said injection fluid in excess of formation pressure to establish a flow of injection fluid out of said chamber via said first channel and into the formation at said first point of fluid communication at a flow rate proportionate to the rate of displacement of said piston and rod.

References Cited by the Examiner
UNITED STATES PATENTS

| | | | |
|---|---|---|---|
| 2,214,064 | 9/1940 | Niles | 166—1 |
| 2,747,401 | 5/1956 | Doll | 73—151 |
| 2,868,625 | 1/1959 | Frank | 23—230 |
| 2,904,113 | 9/1959 | McMahan | 166—100 |
| 3,010,517 | 11/1961 | Lanmon | 166—100 |
| 3,159,214 | 12/1964 | Carter | 166—4 |
| 3,163,211 | 12/1964 | Henley | 166—4 |

RICHARD C. QUEISSER, *Primary Examiner.*

J. JOSEPH SMITH, JR., *Assistant Examiner.*